(No Model.)

A. LAFRANCE.
CORN POPPING APPARATUS.

No. 525,347. Patented Sept. 4, 1894.

Witnesses.
Fred S. Greenleaf.
Thomas J. Drummond.

Inventor.
Alfred Lafrance
by Crosby & Gregory, Attys.

THE NORRIS PETERS CO., PHOTO-LITHO., WASHINGTON, D. C.

UNITED STATES PATENT OFFICE.

ALFRED LAFRANCE, OF MARLBOROUGH, MASSACHUSETTS.

CORN-POPPING APPARATUS.

SPECIFICATION forming part of Letters Patent No. 525,347, dated September 4, 1894.

Application filed June 26, 1894. Serial No. 515,729. (No model.)

*To all whom it may concern:*

Be it known that I, ALFRED LAFRANCE, of Marlborough, county of Middlesex, State of Massachusetts, have invented an Improvement in Corn-Popping Apparatus, of which the following description, in connection with the accompanying drawings, is a specification, like letters and figures on the drawings representing like parts.

This invention relates to apparatus for popping corn, and has for its object the production of mechanism whereby the corn held in a receiving hopper is admitted from time to time in easily regulated quantities to a popper which is reciprocable below the hopper, means being provided for removing or ejecting the corn from the popper as it is popped, so that the operation of the apparatus is automatic and continuous.

In accordance therewith my invention consists in an apparatus for popping corn, of a receiving hopper for the corn, a reciprocating popper movable thereunder and adapted to be heated, combined with an ejector to remove the popped corn, and means to actuate the said popper and ejector, substantially as will be described.

Other features of my invention will be hereinafter described and particularly pointed out in the claims.

Figure 1:
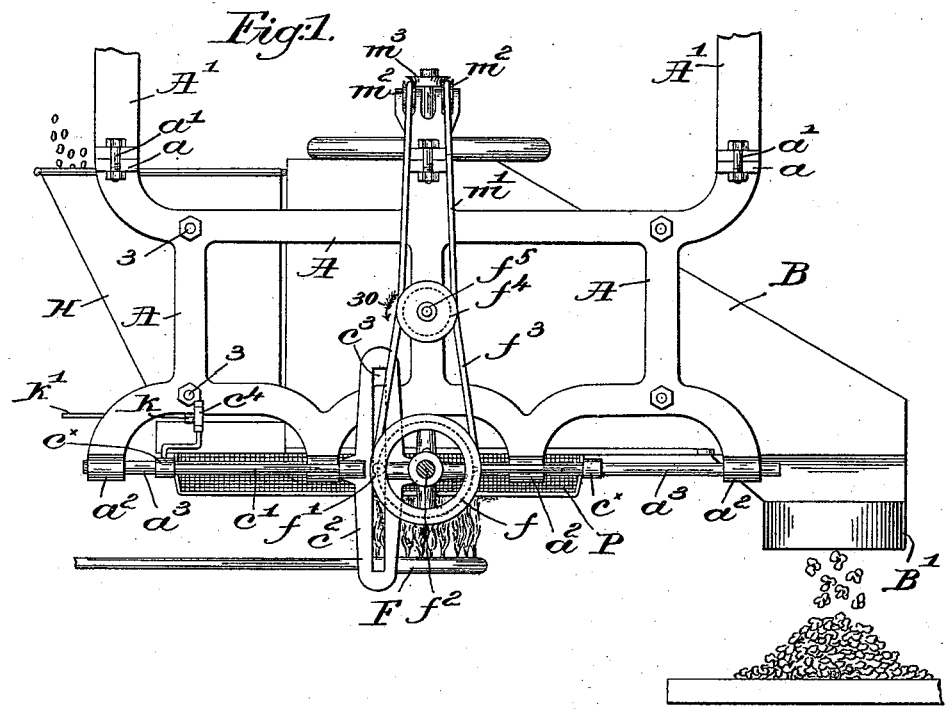
Figure 2:
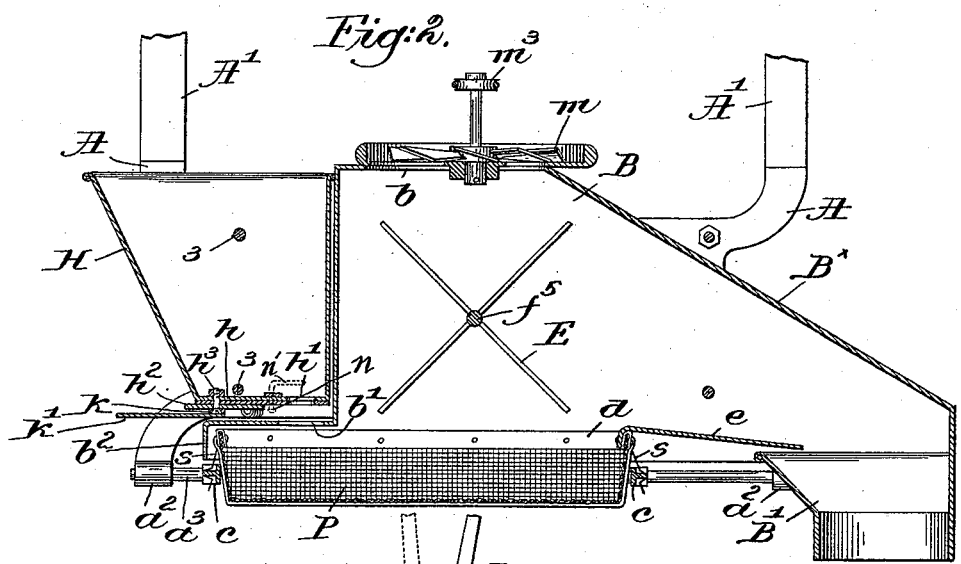
Figure 3:
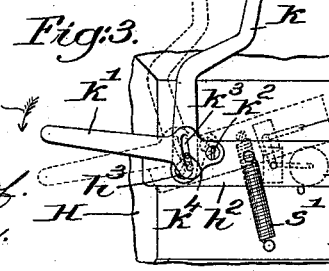

Figure 1, in side elevation represents an apparatus for popping corn, and embodying my invention. Fig. 2 is a longitudinal vertical section of the apparatus shown in Fig. 1; and Fig. 3 is an under side or plan view of the hopper valve and its adjusting mechanism.

The frame-work A, only one side of which is shown in Fig. 1, and of suitable shape to support the operative parts, is provided with ears $a$, whereby it may be secured by bolts $a'$ or otherwise to any suitable bracket or support A', so that preferably the whole apparatus is suspended.

The casing B, having an open bottom, and a delivery chute B' at one end, is secured to the frame-work A, the said casing having a draft opening $b$ therein preferably at its top, as shown in Fig. 2.

The frame-work A is provided with lugs $a^2$ to which guide rods $a^3$ are secured, one on each side of the machine, and a carriage comprising end-bars $c$ having openings therein to receive the guide rods $a^3$ and connecting side bars $c'$, is adapted to slide or be reciprocated back and forth on the guides $a^3$, the path of movement of said carriage being below the open bottom of the casing B, as clearly shown in Fig. 2.

The end-bars $c$ between the boxes $c^x$ are preferably formed of T-iron, as shown in Fig. 2, to engage spring clips $s$ attached to the popper P, herein shown as composed of a metal frame $d$ to which is attached wire gauze or other suitable perforated material, the popper being readily detachable from the carriage by releasing the clips $s$. A plate $c^2$ longitudinally slotted, as at $c^3$ Fig. 1, is rigidly secured to one of the side bars $c'$ of the carriage to receive therein the crank pin $f'$, see dotted lines Fig. 1, of a wheel $f$ supported on a shaft $f^2$, shown in section Fig. 1, at one side of the apparatus, and which may be provided with a handle or other suitable means for rotating it, the wheel or pulley $f$ being herein shown as grooved to receive a belt $f^3$ passed around a double grooved intermediate $f^4$. It will be evident that rotation of the wheel or pulley $f$ will, through the crank pin and the slotted plate $c^2$, cause the carriage and the popper to be reciprocated beneath the open bottom of the casing B.

The popper has secured thereto at its forward end a plate or apron $e$, preferably inclined outwardly, as shown in Fig. 2, and long enough to extend from the end of the popper over the mouth of the delivery chute B' when the popper is at its extreme left hand position, for a purpose to be described.

The hopper H is secured to the frame-work by the connecting bolts or stays 3, the bottom $h$ of the hopper having an opening $h'$ therein above the opening $b'$ in the rearward extension $b^2$ of the casing B.

Referring to Figs. 2 and 3, I have herein shown a valve consisting of a plate $h^2$ pivotally secured by a screw $h^3$ to the bottom $h$ of the hopper, said plate, in its dotted line position Fig. 3, uncovering the opening $h'$ of the hopper and permitting its contents to pass therethrough and through the opening $b'$ of the casing extension, and in its full line position covering the opening and preventing egress of the contents of the hopper. A bent lever $k$ is pivoted on the screw $h^3$ below the valve plate $h^2$, the outer end of the lever projecting into the path of movement of and being adapted to be operated by an actuator $c^4$ supported on and movable with the reciprocating carriage, the actuator normally at each reciprocation of the carriage moving the lever $k$ from full to dotted line position Fig. 3, such movement, by means of the connections now to be described, turning the valve $h^2$ from its full to its dotted line position and uncovering the opening $h'$ in the hopper bottom.

An adjusting device, herein shown as a lever $k'$, pivoted at $k^2$ to the valve $h^2$, is provided with a cam slot $k^3$ to receive therein a pin or stud $k^4$ fast on the lever $k$.

When the parts are in the relative positions shown in Figs. 2 and 3, movement of the lever $k$ will, through the pin and slot connection described, turn the valve $h^2$ with it and about the pivotal point or screw $h^3$, the angle between the lever $k$ and valve $h^2$ remaining constant; if, however, the adjusting lever $k'$ be turned on its pivot $k^2$ in the direction of the arrow 20 Fig. 3, the lever $k$ will be moved to increase the angle between it and the valve according to the amount of movement of the adjusting lever $k'$, the effect of such movement being to cause the outer end of the lever $k$ to be engaged by its actuator nearer the end of the stroke of the latter, so that the valve will not be opened to its full extent, and if the adjusting lever $k'$ be turned in the direction of the arrow to bring the stud $k^4$ into the end of the slot $k^3$, the lever $k$ will be removed out of the range of its actuator, so that the valve will not be operated thereby; movement of the adjusting lever in the opposite direction to the arrow 20 will cause the valve to be opened sooner and remain open longer, the return of the valve to its normal closed position being effected by a spring $s'$ secured at its ends to the valve $h^2$ and hopper bottom respectively.

The shaft $f^5$ of the double grooved pulley $f^4$ extends through the frame-work and casing, and within the casing an ejector E is secured to the shaft, said ejector consisting of a series of radial arms, preferably of wire, the path of movement of the extremities of the arms of the ejector being somewhat below the top of the popper, rotation of the ejector in the direction of the arrow 30, Fig. 1, being effected by means of the endless belt $f^3$.

The hopper is heated by any desirable lamp or heat generator, and I have herein shown a gas or gasoline burner F Fig. 1, provided with a series of openings through which the gas passes to be ignited, although it is obvious that any desired form of heater may be used, the heater itself forming no part of my invention.

To increase and make more effective the action of the heat in popping the corn, I mount in suitable bearings a suction fan $m$ adjacent the opening $b$ in the casing, rotating said fan by means of an endless belt $m'$ passing around one of the grooves of the pulley $f^4$ and over idlers $m^2$ to a suitable grooved wheel $m^3$ on the fan shaft. Rotation of the fan by the means described draws the heated air upwardly through the popper and casing.

In Figs. 2 and 3 I have shown in dotted lines a finger or clearer $n$ secured to the upper side of the valve $h^2$ and passing through a curved slot in the hopper bottom, the end of the finger within the hopper being bent over, as at $n'$, to move back and forth over the opening $h'$ in the hopper bottom to act as a clearer therefor.

The operation of the machine is as follows:—The hopper H is filled with the fresh corn to be popped, the heater is placed in operative position, and the throw of the valve $h^2$ is adjusted by the means described. Rotative movement being imparted to the wheel $f$, the carriage and popper P will be reciprocated back and forth between the heater and the bottom of the casing, and at each reciprocation the actuator $c^4$ will open the valve $h^2$ to admit a portion of the corn from the hopper into the popper, the ejector E at the same time being rotated as described. As the grains of corn become heated and swell or pop, they are thrown out of the popper by the ejector and across the apron $e$ into the delivery chute B, the side walls and preferably inclined top $B^{\times}$ of the casing preventing the escape of the popped corn in other directions. As the actuator is continuously rotated some of the corn would fall between the popper and the delivery chute when the popper was in the position shown in Figs. 1 and 2 were it not for the apron $e$, which, at such time covers the open space between the end of the popper and the delivery chute.

From the foregoing description it will be seen that by means of my apparatus I am enabled to pop corn continuously and to automatically feed fresh corn to the popper and remove the popped corn therefrom, while, if desired, the valve may be so adjusted as to remain closed unless manually opened by the operator.

The corn is rapidly and evenly popped by my improved apparatus and with a very small amount of waste.

Any unpopped grains which are thrown out by the ejector may be afterward placed in the hopper and fed thence to the popper.

While I have herein shown a very simple and convenient form of apparatus for carrying out my invention, I do not restrict myself thereto, as it is obvious that changes in the particular construction or arrangement of parts may be made without departing from the scope of my invention.

I claim—

1. In an apparatus for popping corn, a receiving hopper for the corn, a reciprocating popper movable thereunder, and adapted to be heated, combined with an ejector to remove the popped corn, and means to actuate the said popper and ejector, substantially as described.

2. In an apparatus for popping corn, a receiving hopper for the corn, a valve in the hopper, and a reciprocating popper movable thereunder and adapted to be heated, combined with an ejector to remove the popped corn, an actuator to automatically open and close the hopper valve at intervals, and means to operate the popper and ejector, substantially as described.

3. In an apparatus for popping corn, a casing having an open bottom and a delivery chute, a hopper, and a reciprocating popper adapted to be heated and movable under said hopper and casing, combined with an ejector within the casing, to transfer the popped corn to the delivery chute, a valve to regulate the flow of corn from the hopper, and means to reciprocate the popper, substantially as described.

4. In an apparatus for popping corn, a hopper, a valve therein, and adjusting devices to regulate it, combined with a popper reciprocable under the hopper and adapted to receive the corn therefrom, and an actuator operated by the popper to open the valve when the said popper is in position to receive a supply of corn, substantially as described.

5. In an apparatus for popping corn, a casing having an open bottom and a draft opening, a popper reciprocable under said casing, and means to supply the popper with corn from time to time, combined with a heater beneath the popper, and a suction fan adjacent the draft opening in the casing, substantially as described.

6. In an apparatus for popping corn, a perforated popper adapted to be heated, an outwardly inclined apron projecting from one end thereof, and a delivery chute beneath the path of movement of said apron, combined with an ejector to remove the popped corn from the popper to the apron, and means to reciprocate the popper and actuate the ejector, the popped corn passing from the apron into the delivery chute, substantially as described.

7. In an apparatus for popping corn, a reciprocating carriage, a detachable popper connected thereto, and a heater for the popper, combined with a receiving hopper for the corn, a valve therein, and an actuator to open said valve at each reciprocation of the hopper, substantially as described.

In testimony whereof I have signed my name to this specification in the presence of two subscribing witnesses.

ALFRED LAFRANCE.

Witnesses:
JOHN C. EDWARDS,
FREDERICK L. EMERY.